United States Patent [19]
Higuchi et al.

[11] Patent Number: 5,392,163
[45] Date of Patent: Feb. 21, 1995

[54] DIGITAL VIDEO SIGNAL REPRODUCING APPARATUS WITH COMPRESSION AND EXPANSION OF PLAYBACK TIME

[75] Inventors: Shigemitsu Higuchi, Fujisawa; Atsuo Suga, Kamagaya; Yuji Inaba; Toshiro Aizawa, both of Katsuta, all of Japan

[73] Assignee: Hitachi, Ltd., Tokyo, Japan

[21] Appl. No.: 161,455

[22] Filed: Dec. 6, 1993

Related U.S. Application Data

[63] Continuation of Ser. No. 551,012, Jul. 11, 1990, abandoned.

[30] Foreign Application Priority Data

Jul. 12, 1989 [JP] Japan .................. 1-177921

[51] Int. Cl.$^6$ .............................................. H04N 5/78
[52] U.S. Cl. ...................... 360/10.1; 360/65; 360/73.04; 360/75
[58] Field of Search .................. 360/65, 8, 9.1, 19.1, 360/69, 70, 71, 72.3, 73.01, 73.04, 73.09, 73.14, 73.11, 73.12, 77.12, 75, 10.1

[56] References Cited

U.S. PATENT DOCUMENTS

| | | | |
|---|---|---|---|
| 4,463,390 | 7/1984 | Koga | 360/10.3 |
| 4,688,115 | 8/1987 | Takahashi et al. | 360/70 |
| 4,942,487 | 7/1990 | Noguchi et al. | 360/70 X |
| 5,045,954 | 9/1991 | Oishi et al. | 360/70 X |

FOREIGN PATENT DOCUMENTS

| | | |
|---|---|---|
| 0104071 | 3/1984 | European Pat. Off. . |
| 0254511 | 1/1988 | European Pat. Off. . |
| 0276343 | 8/1988 | European Pat. Off. . |
| 59-89085 | 5/1984 | Japan . |
| 2128838 | 5/1984 | United Kingdom . |

OTHER PUBLICATIONS

Inagaki, "D2NTSC composite digital VTR", Television Society Technical Report, vol. 11 No. 24 pp. 13-18, Oct. 1987.

*Primary Examiner*—Andrew L. Sniezek
*Attorney, Agent, or Firm*—Antonelli, Terry, Stout & Kraus

[57] ABSTRACT

For the purpose of data compression and expansion in the playback mode reproducing data including video data and audio data recorded on a magnetic tape, a relative speed signal is generated from a circuit on the basis of the moving speed of the magnetic tape and the rotation speed of a head drum, and the characteristic of the recorded data is controlled according to this relative speed signal. The tension of the magnetic tape is detected by a circuit, and the phase difference between the detected tape tension signal and a reel rotation speed command signal is detected by a circuit so as to control the tape tension according to the detected phase difference. When a target value of the drum rotation speed is changed, a drum drive signal is changed stepwise at a predetermined time interval, and the amount of delay of a drum rotation reference signal delayed according to a signal indicative of the rotation speed of a capstan is changed, so as to determine the range in which both the capstan rotation speed and the drum rotation speed can be changed. Interfaces are disposed between a system controller and a pitch controller so as to control the tone pitch of the audio signal according to the capstan rotation speed signal.

14 Claims, 9 Drawing Sheets

DIGITAL VIDEO SIGNAL REPRODUCING APPARATUS WITH COMPRESSION AND EXPANSION OF PLAYBACK TIME

This application is a continuation of application Ser. No. 07/551,012, filed on Jul. 11, 1990, now abandoned.

BACKGROUND OF THE INVENTION

This invention relates to a digital video signal reproducing apparatus, and more particularly to an apparatus of the kind described above in which compression and expansion of picture data recorded on a magnetic tape can be carried out at the time of reproduction without substantially degrading the picture quality as well as the sound quality.

Digital magnetic recording and reproducing apparatuses recording and reproducing a video signal after converting it into a digital signal have been developed and put into practical use. As an example of these apparatuses, there is an apparatus which is based on a method of recording as described in a document entitled "D2 NTSC Composite Digital VTR", Technical Report of the Institute of Television Engineers of Japan, 11, 24, pp. 13-18 (1987). This technical report is based on the same ground as that defined in the D2 Standards of SMPTE (Society of Motion Picture and Television Engineers) of U.S.A.

The recording format of this digital magnetic recording and reproducing apparatus is shown in FIG. 13. Referring to FIG. 13, digital video data of one channel and digital audio data of four channels are recorded on helical tracks HLT on a magnetic tape. A CTL signal, a time code TC and a CUE signal are recorded on a control track CTT, a time code track TCT and an analog audio track AOT on the magnetic tape, respectively. This manner of data recording is attained, for example, by the use of a drum 1 as shown in FIG. 14. Referring to FIG. 14, the drum 1 includes four recording heads REC1 to REC4 used for recording data of two channels, and one field is recorded on the magnetic tape by 1.5 rotations of the cylinder. The recorded data is reproduced by four playback heads PB1 to PB4 provided for the exclusive purpose of reproduction.

JP-A-59-89085 discloses such a digital video signal recording and reproducing apparatus which can carry out compression and expansion of picture data, recorded on a magnetic tape, at the time of reproduction without substantially degrading the picture quality as well as the sound quality. For the purpose of compression and expansion of recorded data at the time of reproduction, the magnetic tape is driven at a non-standard speed, and the drum 1 is also rotated at the non-standard speed, thereby temporarily storing all the data recorded on the magnetic tape in a memory, so that the data belonging to, for example, one field can be dropped out or inserted.

However, the prior art apparatus described above, in which both the magnetic tape and the drum are driven at the non-standard speed in the playback mode, has been defective in that the frequency of the recorded data reproduced from the magnetic tape tends to change, resulting in an increased error rate of the recorded data reproduced from the magnetic tape, thereby greatly degrading the picture quality as well as the sound quality at the time of reproduction.

The prior art apparatus has also been defective in that, when the speed of reproduction is abruptly changed, the magnetic heads tend to run out from the tracks, resulting similarly in undesirable degradation of both the picture quality and the sound quality.

Further, the prior art apparatus has had such another problem that, when a conventional pitch controller available on the market is used for the reproduction of the tone signal, the tone pitch cannot be accurately corrected, even when the speed of reproduction is detected on the basis of the time code TC so as to correct the tone pitch. The conventional pitch controller requires suitable means for correcting the tone pitch, because the reproduced tone pitch changes with the change in the moving speed of the magnetic tape.

SUMMARY OF THE INVENTION

With a view to solve the prior art problems described above, it is an object of the present invention to provide a digital video signal reproducing apparatus which has a function of compressing and expanding data recorded on a magnetic tape without substantially degrading both the picture quality and the sound quality at the time of reproduction.

It is a first feature of the present invention that a digital video signal reproducing apparatus comprises a circuit generating a command signal instructing compression and expansion of data including video data and audio data recorded on a magnetic tape in reproduction, and a data extracting circuit for controlling the characteristic of the recorded data in response to the command signal so that the recorded data can be transferred at a data transfer rate required for processing the recorded data. Therefore, a change in the frequency characteristic of the recorded data can be accurately corrected, so that an undesirable increase in the read error can be prevented regardless of any change in the moving speed of the magnetic tape as well as the rotation speed of a magnetic head drum.

It is a second feature of the present invention that the apparatus comprises a tension detecting circuit detecting the tension of the magnetic tape, thereby generating a tape tension signal, a tape tension reference signal generating circuit generating a speed command signal instructing the rotation speed of a reel having the magnetic tape wound therearound, an arithmetic circuit computing a phase difference between the speed command signal and the tape tension signal, thereby generating a phase difference signal, and a tape reel driver generating, in response to the phase difference signal, a drive signal for driving the tape reel. Therefore, the magnetic tape is prevented from being out of contact with the magnetic head drum regardless of any change in the moving speed of the magnetic tape as well as the rotation speed of the magnetic head drum.

It is a third feature of the present invention that the apparatus comprises a servo unit driving a capstan and the drum, the servo unit including a phase detector comparing a signal indicative of the rotation speed of the drum with a predetermined reference signal, thereby detecting the phase difference therebetween, a frequency discriminator discriminating a frequency of the drum rotation speed signal on the basis of a target value based on a command signal instructing the rotation speed of the drum, a drum driver generating a drum drive signal for driving the drum on the basis of the detected phase difference and the result of frequency discrimination, thereby changing the drum drive signal at a predetermined time interval in response to a change in the target value, and a first error computing circuit discriminating a frequency of a signal indicative of the rotation speed of the capstan on the basis of a target value based on a command signal instructing the rotation speed of the capstan, thereby computing a phase difference between the capstan rotation speed signal and the target value, a second error computing circuit delaying the drum rotation reference signal according to the capstan rotation speed signal thereby generating a delayed reference signal and computing the phase difference between the delayed reference signal and a predetermined control signal recorded on the magnetic tape, and a capstan driver for generating a capstan drive signal on the basis of the phase differences computed by the first error computing circuit and the second error computing circuit respectively, thereby changing the amount of delay of the delayed signal according to the capstan rotation speed command signal.

It is a fourth feature of the present invention that the apparatus comprises a system control unit for generating command signal instructing the rotation speeds of the drum and the capstan, a pitch control unit for controlling the tone pitch of an audio output signal, and an interface circuit disposed between the system control unit and the pitch control unit for controlling the tone pitch of the audio output signal according to the capstan rotation speed command signal. Therefore, regardless of any change in the moving speed of the magnetic tape and the rotation speed of the magnetic head drum, the tone pitch of the audio output signal generated from the pitch control unit can be accurately corrected according to the speed change.

DESCRIPTION OF THE PREFERRED EMBODIMENTS

Figure 1:
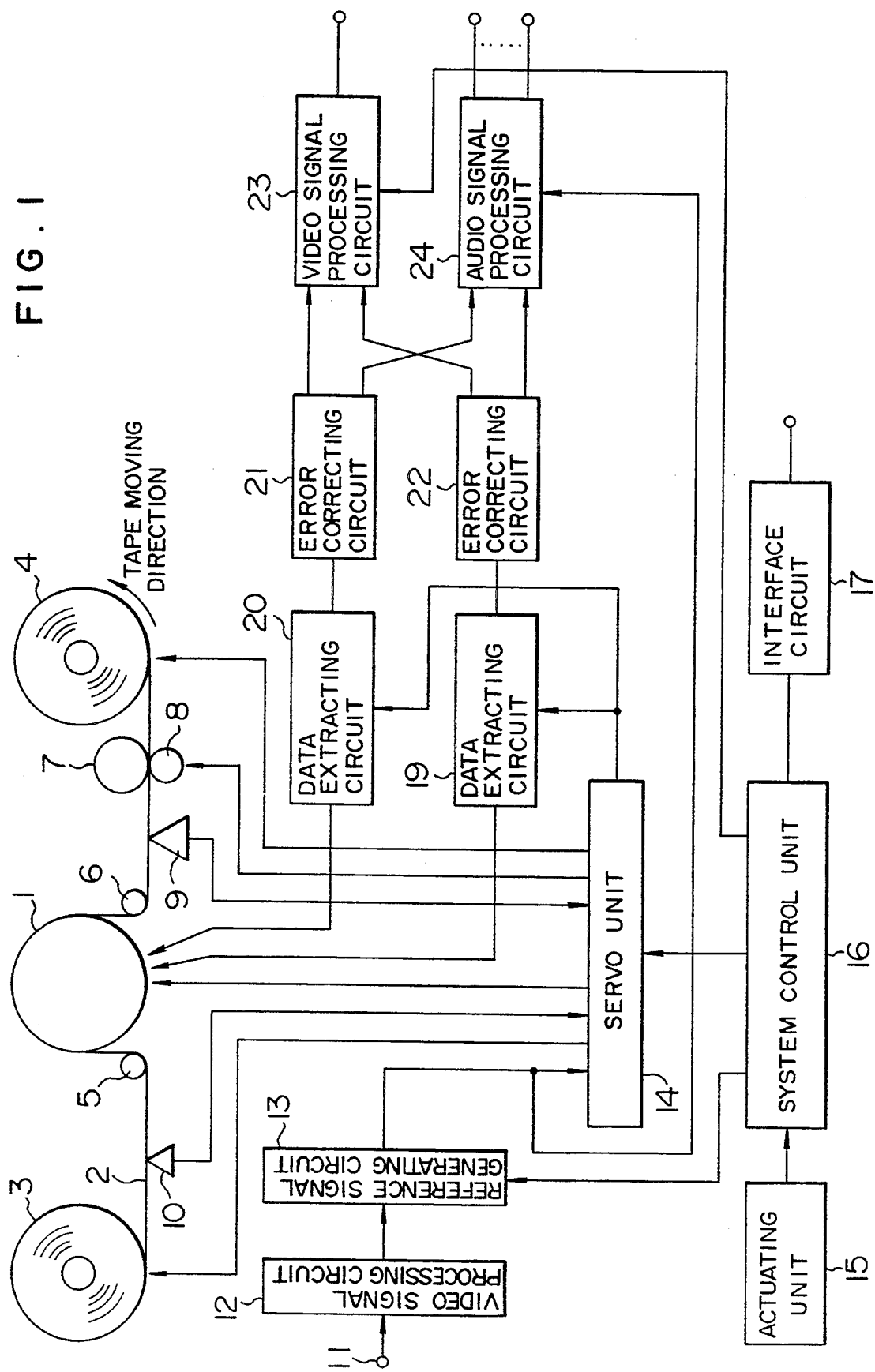
FIG. 1 is a block diagram schematically showing the general structure of an embodiment of the digital video signal reproducing apparatus according to the present invention.

A preferred embodiment of the digital video signal reproducing apparatus according to the present invention will now be described in detail with reference to the drawings. FIG. 1 is a block diagram schematically showing the general structure of the embodiment of the apparatus of the present invention. The apparatus embodying the present invention comprises video signal processing circuit 12, a reference signal generating circuit 13, a servo unit 14, an actuating unit 15, a system control unit 16, an interface circuit 17, data extracting circuits 19 and 20, error correcting circuits 21 and 22, video signal processing circuit 23, and an audio signal processing circuit 24.

Figure 13:
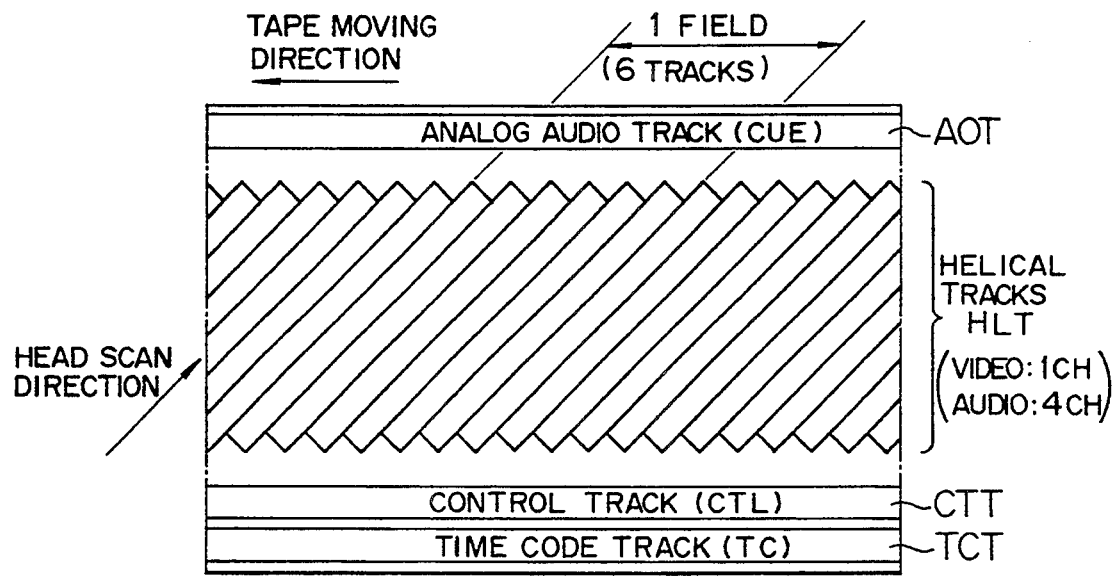
FIG. 13 illustrates a recording format of a magnetic tape from which data is reproduced by the apparatus of the present invention.
Figure 14:
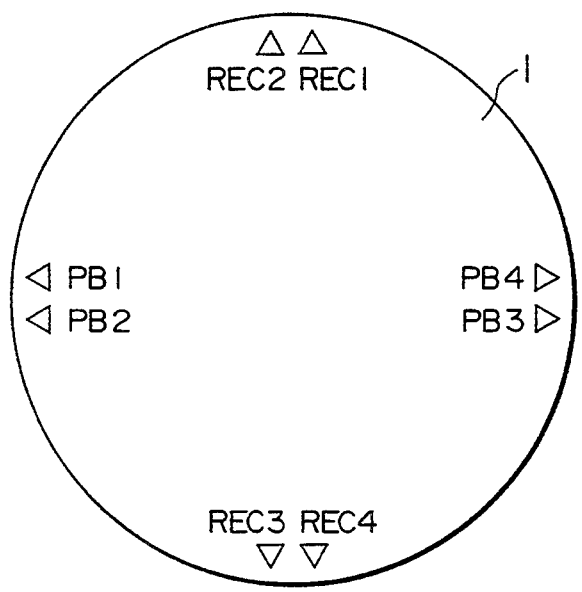
FIG. 14 illustrates the magnetic head arrangement on a drum carrying magnetic heads for recording and reproducing data on and from the magnetic tape shown in FIG. 13.

Referring to FIG. 1, a magnetic tape 2 supplied from a supply reel 3 is guided by tape guides 5 and 6 to be wound around part of a drum 1 and is taken up on a take-up reel 4 while passing between a pinch roller 7 and a capstan part 8. As described already with reference to FIG. 14, recording heads REC1 to REC4 and playback heads PB1 to PB4 are mounted on the drum 1. The drum 1 is rotated by a drum motor (not shown). Further, although not shown in FIG. 1, a drum FG (frequency generator) coil for detecting the motor rotation speed is mounted around the drum motor, and a drum TP (tachometer pulse) generator for detecting the drum rotation phase is also associated with the drum motor. At a position adjacent to the tape guide 6 and along the moving path of the magnetic tape 2, a CTL head 9 is disposed so as to record and reproduce a CTL signal on and from a control track CTT provided on the magnetic tape 2, as shown in FIG. 13. The capstan part 8 includes a capstan, a motor for rotating the capstan, and a capstan FG coil for detecting the rotation speed of the capstan motor. The magnetic tape 2 is forwardly moved by the combination of the capstan and the pinch roller 7. The magnetic tape 2 is supplied from the supply reel 3 rotated by a reel motor (not shown) to be taken up on the take-up reel 4. A tape tension sensor 10 detects the tension of the magnetic tape 2 thereby controlling the reel motors, so that the magnetic tape 2 can be forwardly moved under a proper tension.

Figure 12:
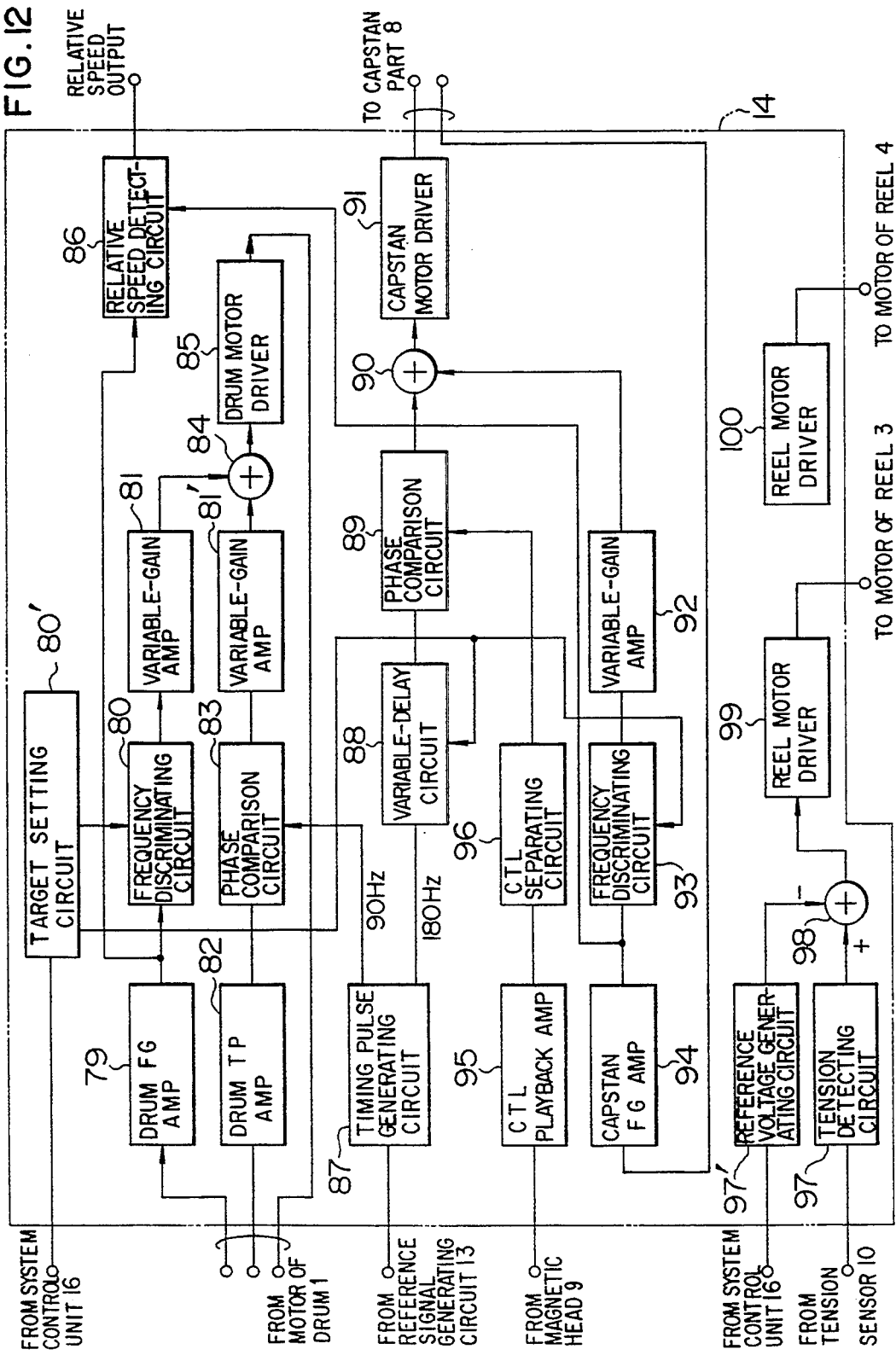
FIG. 12 is a block diagram showing in detail the structure of one form of the servo unit incorporated in the embodiment shown in FIG. 1.

The servo unit 14 acts to adequately control both the drum 1 and the capstan part 8 thereby controlling both the tape position and the head position, so that the required recording format can be met. FIG. 12 is a block diagram showing in detail the structure of one form of the servo unit 14. The drum 1 is controlled in a manner as described with reference to FIGS. 1 and 12. Referring to FIGS. 1 and 12, a video signal is applied through an input terminal 11 to the video signal processing circuit 12, and the output signal of the video signal processing circuit 12 is applied to the reference signal generating circuit 13 which generates a reference signal including a synchronizing signal. The synchronizing signal is applied to a timing pulse generating circuit 87. The drum timing pulse signal from the drum timing pulse (TP) generator associated with the drum 1 is applied, after being amplified by a drum TP pulse amplifier 82, to a phase comparison circuit 83 to which the output signal of the timing pulse generating circuit 87 is also applied. The phase comparison circuit 83 compares the phase of these two input signals so as to detect the phase difference therebetween. The FG signal from the drum FG coil is applied, after being amplified by a drum FG amplifier 79, to a frequency discrimination circuit 80 which discriminates the frequency of the drum FG signal on the basis of a target value set by a target value setting circuit 80' according to a speed command signal applied from the system control unit 16. The output signals of the frequency discrimination circuit 80 and the phase comparison circuit 83 are amplified by respective variable-gain amplifiers 81 and 81' whose gains are variable according to the detected rotation speed of the drum 1, and the amplifier output signals are then added together in an adder 84. The resultant output signal of the adder 84 is applied to a drum motor driver 85 which drives the motor of the drum 1.

Figure 16:
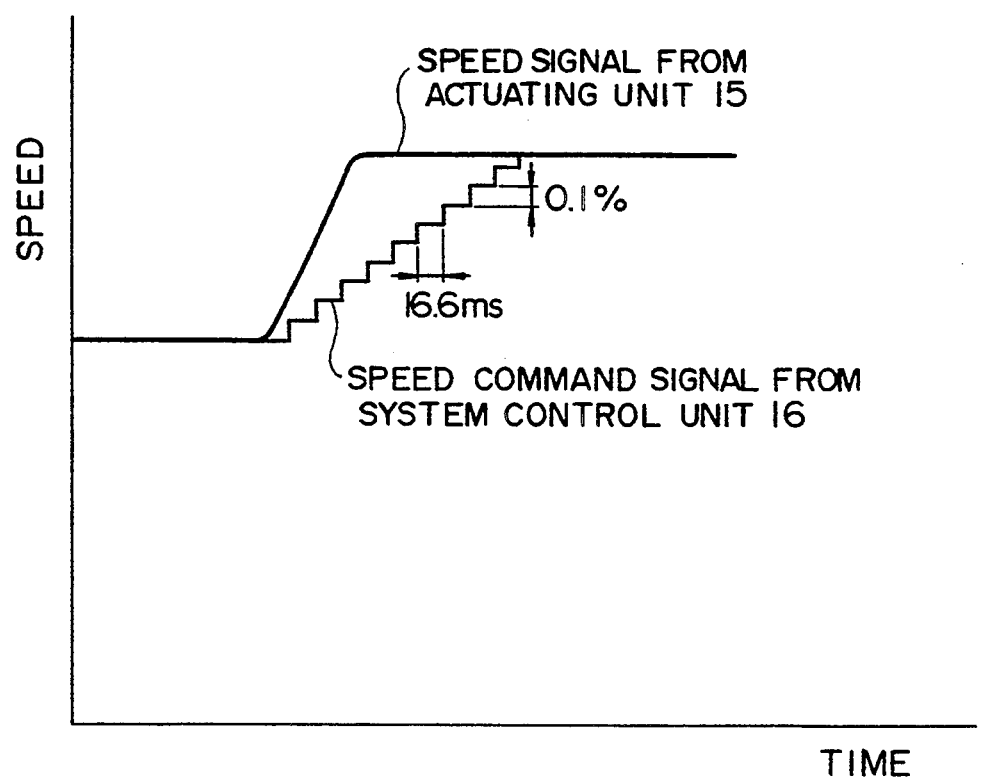
FIG. 16 is a graph showing the relation between a speed command signal applied from the actuating unit shown in FIG. 1 and a speed command signal actually applied from the system control unit shown in FIG. 1.

The drum 1 is rotated in synchronism with the reference signal generated from the reference signal generating circuit 13. In the illustrated embodiment, the drum rotation speed command signal applied from the system control unit 16 to both the servo unit 14 and the reference signal generating circuit 13 is not abruptly changed even when the target speed is abruptly changed by the actuating unit 15 shown in FIG. 1. Instead of such an abrupt change, the speed command signal applied from the system control unit 16 is changed stepwise, that is, the speed is changed at a rate of, for example, 0.1% at a time interval of 16.6 ms, as shown in FIG. 16, until the target speed is reached. Thus, both the drum rotation speed and the reference signal are gradually and smoothly changed, so that the servo control may not fail to properly control the drum motor driving the drum 1.

The capstan is controlled in a manner as described below. The capstan FG signal is applied, after being amplified by a capstan FG amplifier 94, to a frequency discrimination circuit 93 which discriminates the frequency of the capstan FG signal on the basis of a target value set by the target value setting circuit 80', thereby detecting a phase error voltage. The CTL signal recorded on the control track CTT on the magnetic tape 2 is amplified by a CTL playback amplifier 95 and, after being separated by a CTL separating circuit 96, applied to a phase comparison circuit 89. On the other hand, under command of the system control unit 16 shown in FIG. 1, the reference signal generating circuit 13 generates the reference signal having a changed frequency, and this reference signal is applied to the timing pulse generating circuit 87. The output signal of the timing pulse generating circuit 87 passes through a variable-delay circuit 88 in which the amount of delay is variable according to the detected rotation speed of the capstan motor, and the delayed reference signal is applied to the phase comparison circuit 89. The phase comparison circuit 89 compares the phase of the delayed reference signal with that of the CTL signal thereby detecting a phase error voltage.

The phase error voltage detected by the phase comparison circuit 89 is added in an adder 90 to the phase error voltage which is detected by the frequency discrimination circuit 93 and then amplified by a variable-gain amplifier 92, and the resultant output signal of the adder 90 is applied to a capstan motor driver 91 which drives the capstan motor. The system described above is featured in that the amount of delay of the reference signal by the variable-delay circuit 85 is changed according to the speed command signal at the time of compression and expansion of recorded data, so that the magnetic heads PB1 to PB4 can accurately make access to the desired tracks at whatever rotation speed of the capstan motor.

Figure 17:
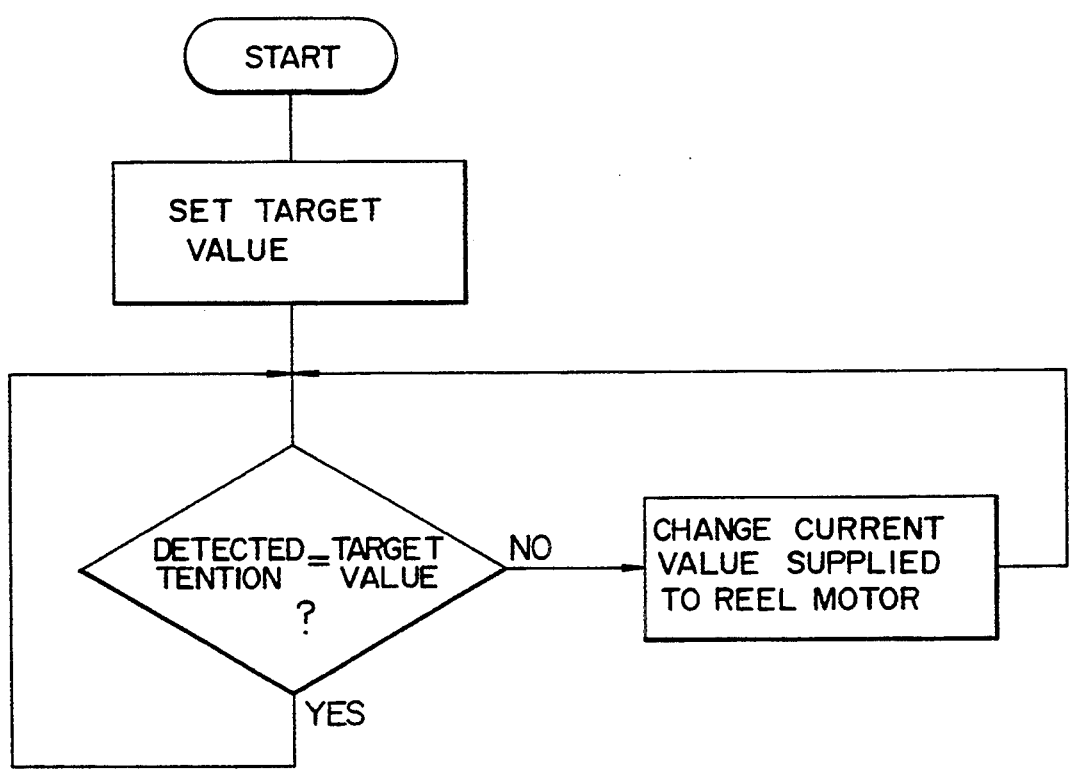
FIG. 17 is a flow chart showing the steps of controlling the tape tension by software.

The tape tension is controlled in a manner as described below. At the time of compression and expansion of the recorded data, a tape tension reference voltage generating circuit 97' generates a tape tension reference voltage under command of the system control unit 16. This reference voltage is obtained from calculating in an arithmetic circuit 98 from the output signal of a tape tension detecting circuit 97 to which the output signal of the tape tension sensor 10 is applied, so that the reference voltage is changed. Thus, the input voltage to a reel motor driver 99 connected to the arithmetic circuit 98 is changed so as to control the reel motor of the supply reel 3. The reel motor of the take-up reel 4 is controlled by another reel motor driver 100. Although such a manner of tape tension control is carried out by the circuit described above, this tension control may also be attained by software as shown in FIG. 17. Referring to FIG. 17, the target value of the tape tension is previously determined, and the detected value of the tape tension is compared with this predetermined target value. When the detected value of the tape tension is not equal to the target value, the value of the motor current of the reel motor is changed until the detected value of the tape tension becomes equal to the target value.

When the rotation speed of the drum 1 is changed in the manner described above, especially when he drum rotation speed is increased, a tape touch of the magnetic heads PB1 to PB4 becomes badly. In order to prevent such a had tape touch, the rotation speed of the reel motor of the supply reel 3 is controlled in the manner described above so as to suitably change the tension imparted to the magnetic tape 2.

It will be seen from the above description of the servo unit 14 that, in the speed control system for controlling the rotation speeds of the drum 1 and the capstan, the speed command signal from the system control unit 16 is directly used to control the rotation speeds until they attain their target values, while, in the phase control system, the reference signal is controlled with the accuracy of 0.1%, so that the drum motor of drum 1, the reel motor of the supply reel 3 and the capstan motor can accurately and stably operate. Further, even when the speed command signal from the actuating unit 15 greatly changes, the level of the speed command signal is limited to within a predetermined range thereby preventing failure of proper control by the servo system, with the result that the magnetic tape 2 can be prevented from being out of contact with drum 1, and undesirable degradation of the picture quality. In the embodiment of the present invention, a change in the speed command signal is limited to within a response range of the drum 1 because of a slow response of the drum 1. Also, by controlling the tension of the magnetic tape 2, undesirable deterioration of the surface of the magnetic heads due to an abrupt speed change can be prevented, thereby preventing undesirable degradation of the picture quality.

The output of the drum FG amplifier 79 and the output of the capstan FG amplifier 94 are applied to a relative speed detecting circuit 86. On the basis of these inputs indicating the detected drum rotation speed and the detected tape moving speed, respectively, the relative speed detecting circuit 86 makes necessary computation and generates an output signal indicating the relative speed of the magnetic heads. This relative speed represents the vector sum of the rotation speed of the drum 1 and the moving speed of the magnetic tape 2.

The apparatus of the present invention includes a signal processing system which will be described below. Referring to FIG. 1, the signal reproduced from the magnetic tape 2 by the playback heads PB1 to PB4 on the drum 1 is separated into the clock signal and serial data by the data extracting circuits 19 and 20. These data extracting circuits 19 and 20 have the same structure, and FIG. 2 shows in detail the structure of one form of each of these circuits 19 and 20.

Figure 2:
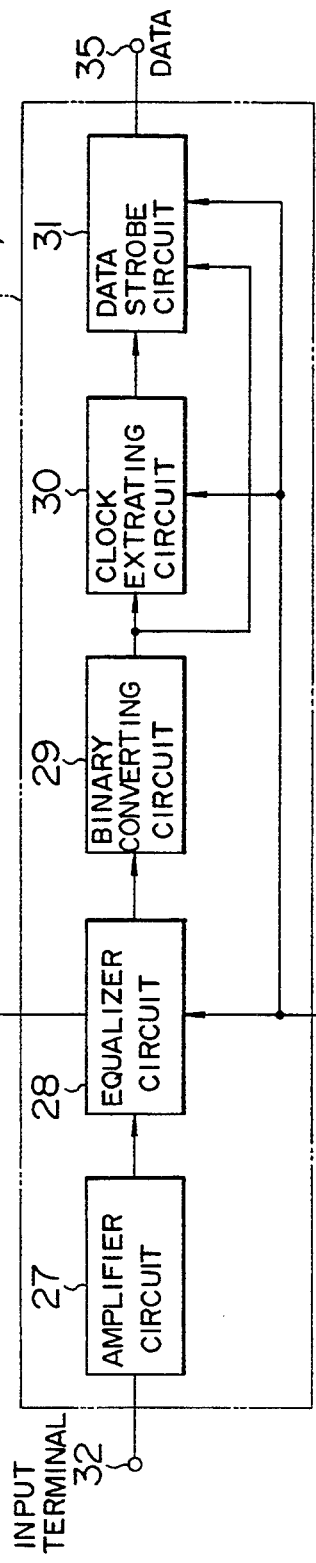
FIG. 2 is a block diagram showing in detail the structure of one form of the data extracting circuit incorporated in the embodiment shown in FIG. 1.
Figure 11:
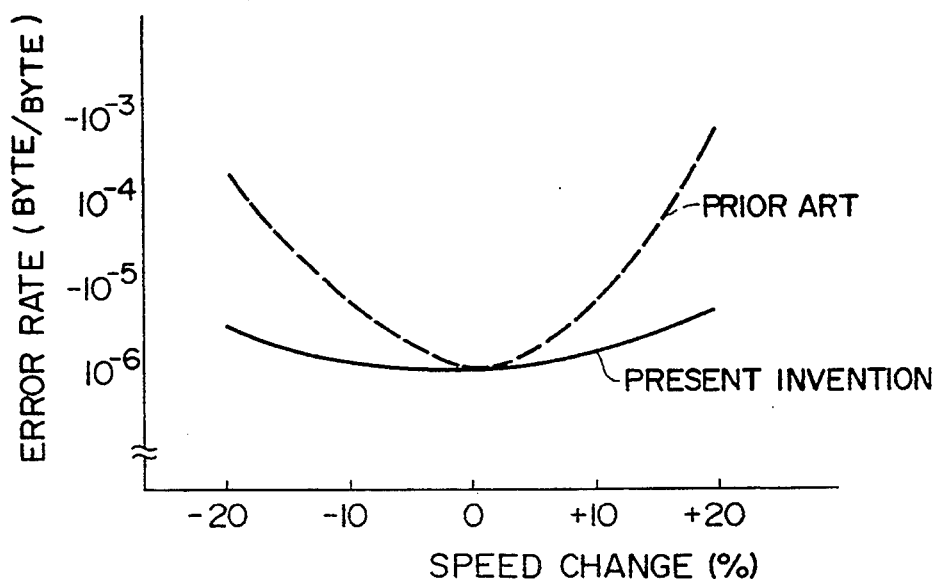
FIG. 11 illustrates how the error rate is improved according to the present invention.

Referring to FIG. 2 showing the structure of each of the data extracting circuits 19 and 20, the recorded data supplied to an input terminal 32 is applied, after being amplified up to a required level by an amplifier circuit 27, to an equalizer circuit 28 in which the frequency of the recorded data is equalized to the frequency characteristic of the relative speed signal applied to another input terminal 33 from the relative speed detecting circuit 86. As a result, waveform interference is eliminated. Then, the recorded data is converted into binary recorded data by a binary converting circuit 29. The binary recorded data is supplied to a clock extracting circuit 30. The clock extracting circuit 30 extracts the clock signal according to the relative speed signal applied from the relative speed detecting circuit 86, and the extracted clock signal is applied to a data strobe circuit 31. That is, the structure of the clock extracting circuit 30 is based on a known PLL (phase locked loop). The binary recorded data is sampled by the extracted clock signal in the data strobe circuit 30 where the adverse effect of jitter is removed, and the recorded signal video data free from jitter appears at an output terminal 35. FIG. 11 shows the error rate of the recorded data relative to a change in the moving speed of the magnetic tape 2, that is, the error rate of the recorded data in terms of the byte/byte. The broken curve in FIG. 11 represents the error rate in the case of the prior art apparatus, and it will be seen that the error rate greatly changes relative to a change in the tape speed. On the other hand, the solid curve in FIG. 11 represents the error rate in the case of the apparatus of the present invention, and it will be seen that the error rate changes very little relative to a change in the tape speed.

Figure 3:
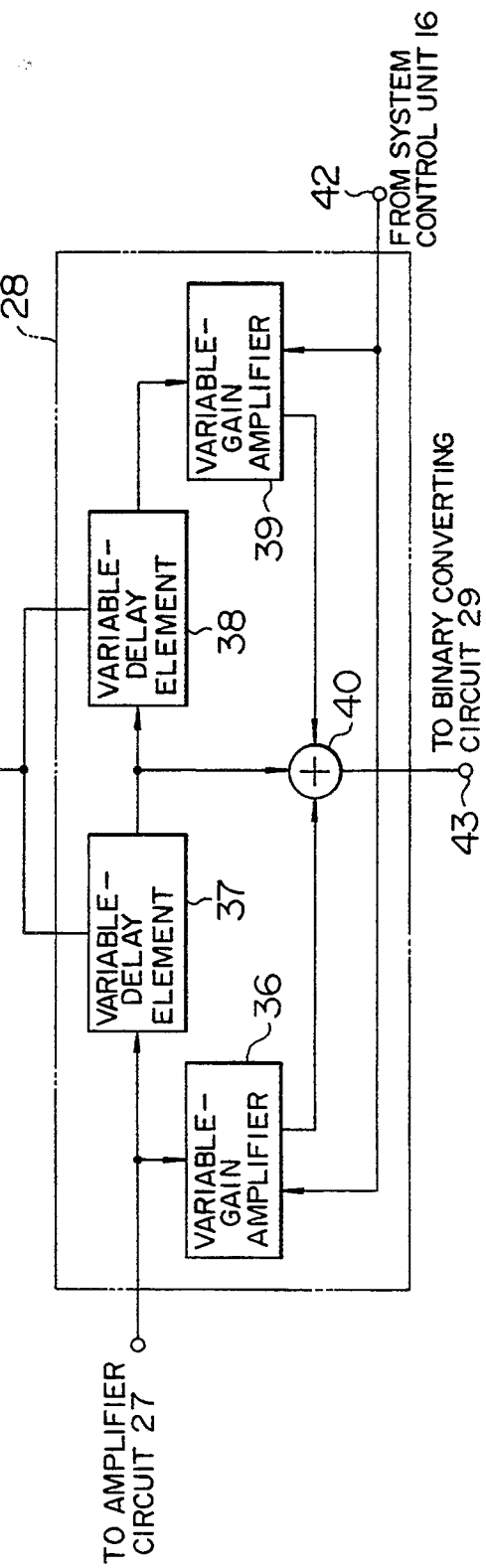
FIG. 3 is a block diagram showing in detail the structure of one form of the equalizing circuit incorporated in the data extracting circuit shown in FIG. 2.
Figure 5:
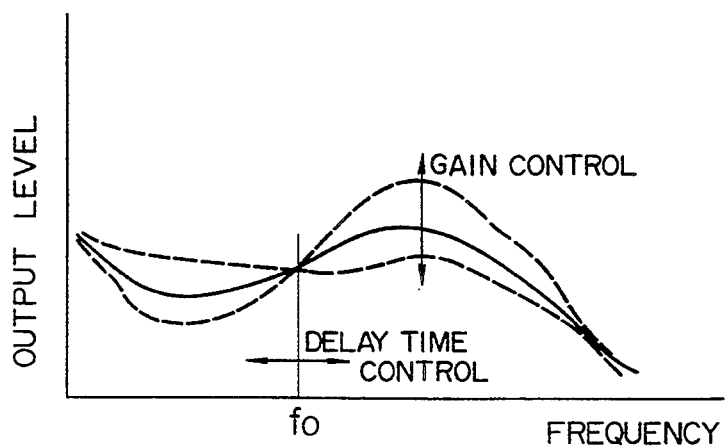
FIG. 5 shows the frequency characteristic of the equalizing circuit shown in FIG. 3.

FIG. 3 shows in detail the structure of one form of the equalizer circuit 28 which is in the form of a three-tapped known transversal filter. Referring to FIG. 3, the relative speed signal from the relative speed detecting circuit 86 is applied tonka control input terminal 41 as a control signal. This control signal is applied to two variable-delay elements 37 and 38 to change the delay time of these elements 37 and 38, thereby changing the center frequency $f_o$ of the transversal filter. Another control signal is applied from the system control unit 16 to another control input terminal 42. This latter control signal is applied to two variable-gain amplifiers 36 and 39 to change the gain of these amplifiers 36 and 39, thereby changing the frequency characteristic of the transversal filter. The output signal of the variable-delay element 37 and the output signals of the variable-gain amplifiers 36 and 39 are added together in an adder 40, and the resultant output signal of the adder 40 is applied to the binary converting circuit 29. It will be seen from FIG. 5 that the operating characteristic of the equalizer circuit 28 is changed by both the delay time control and the gain control. That is, when the moving speed of the magnetic tape 2 increase to a level higher than the standard speed, the output signal of the relative speed detecting circuit 86 acts to raise the center frequency $f_o$ of the equalizer circuit 28, while the tape speed decreases to a level lower than the standard speed, the output signal of the relative speed detecting circuit 86 acts to lower the center frequency $f_o$. The degree of the gain control need not commonly be appreciably changed depending on the detected moving speed of the magnetic tape 2. However, after changing the center frequency $f_o$ according to the tape speed, the system control unit 16 may act to change the gain so as to minimize the error rate. In this case, the gain is changed to minimize the error rate after the center frequency $f_o$ is changed according to the moving speed of the magnetic tape 2.

Figure 4:
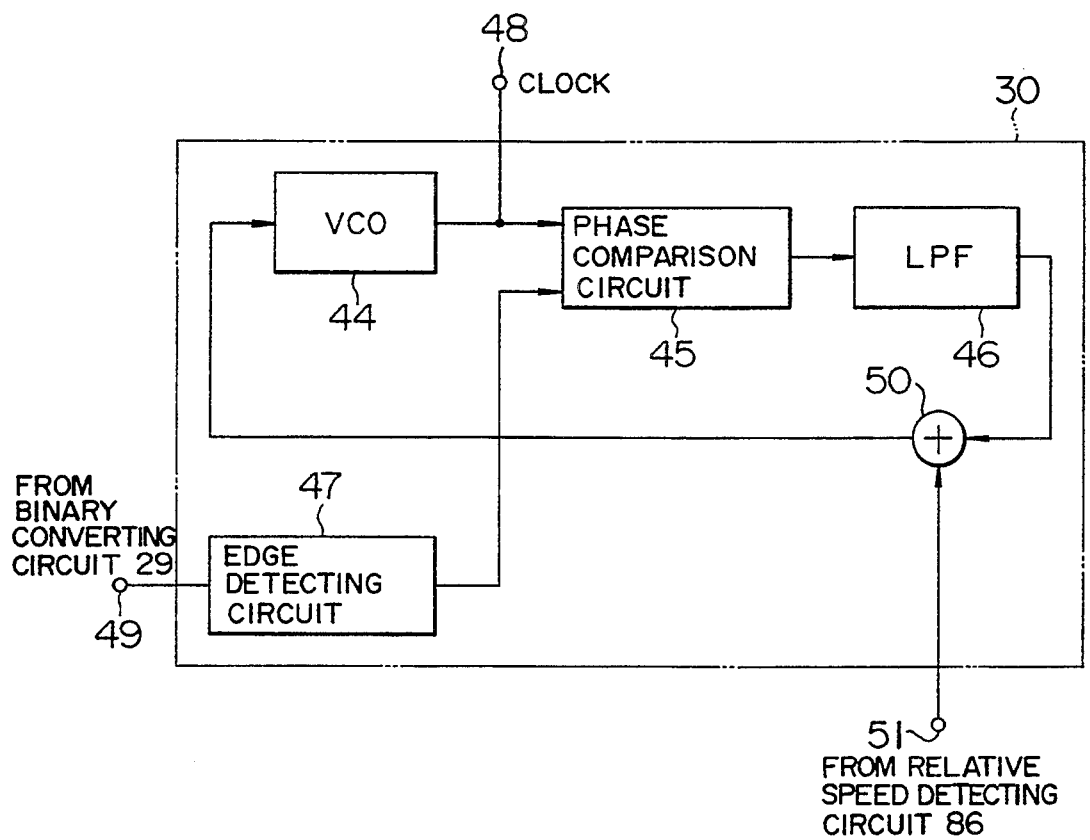
FIG. 4 is a block diagram showing in detail the structure of one form of the clock extracting circuit incorporated in the data extracting circuit shown in FIG. 2.

FIG. 4 shows in detail the structure of one from of the clock extracting circuit 30. Referring to FIG. 4, the center frequency $f_o$ of a VCO (voltage-controlled oscillator) 44 is controlled according to the data transfer rate so as to accurately extract the clock signal, so that the PLL circuit may not be unlocked or a side lock phenomenon may not appear. According to, for example, the D2 standards of SMPTE (Society of Motion Picture and Television Engineers), the data transfer rate is defined such that, in the case of a digital VTR, data of two channels can be simultaneously recorded and reproduced. In this case, data of 63.5 Mbps per channel can be recorded. That is, recorded data amounting to the total of 127 Mbps can be transferred. This 127 Mbps is called the data transfer rate. This data transfer rate changes according to the relative speed between the rotation speed of the drum 1 and the moving speed of the magnetic tape 2. The side lock referred to above is the phenomenon where the frequency of the recorded data is not locked to the center frequency $f_o$ of the VCO 44 but is locked to a frequency different from the center frequency $f_o$ of the VCO 44.

Referring to FIG. 4 again, the binary recorded data (whose transfer rate is 64 Mbps ±20% in the illustrated embodiment) is supplied from the binary converting circuit 29 to an input terminal 49, thence to an edge detecting circuit 47 which detects the leading and trailing edges of the data input. The VCO 44 oscillates at a clock frequency lying in the range of 128 MHz ±20%. The output signal of the VCO 44 is applied through an output terminal 48 to the data strobe circuit 31. The phase of the output signal of the VCO 44 is compared in a phase comparison circuit 45 with that of the recorded-data edge information from the edge detecting circuit 47, and the VCO 44 operates so that its output signal is locked to the recorded-data edge information generated from the edge detecting circuit 47. The output signal of the phase comparison circuit 45 is applied through an LPF (low-pass filter) 46 to an adder 50. On the other hand, the output signal of the relative speed detecting circuit 86 is applied also to the adder 50. The adder 50 adds these two input signals and applies the resultant signal to the VCO 44. As a result, the VCO 44 oscillates at the center frequency $f_o$ which is two times as high as the transfer rate of the data input to the edge detecting circuit 47. Therefore, the PLL circuit accurately operates, and the clock signal can be accurately extracted.

Figure 15:
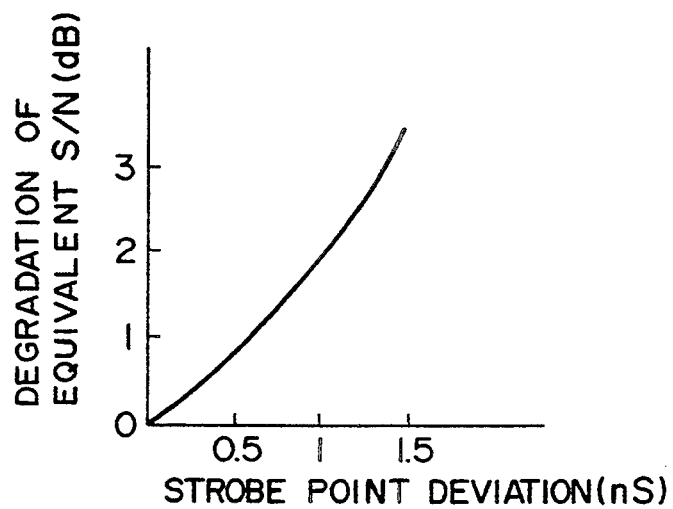
FIG. 15 is a graph showing the relation between deviation of the strobe point and degradation of the S/N ratio.

When the strobe point in the data strobe circuit 31 deviates from its ideal position, the equivalent S/N ratio is degraded as shown in FIG. 15, and this degraded S/N ratio leads to an undesirable increase in the error rate. Deviation of the strobe point by 1 ns from the ideal position corresponds equivalently to degradation of the S/N ratio by about 2 dB, and the error rate will be degraded by the factor of about $10^2$. However, such a phenomenon can be prevented by changing the timing of the clock signal and that of the recorded data according to the data transfer rate.

Figure 6:
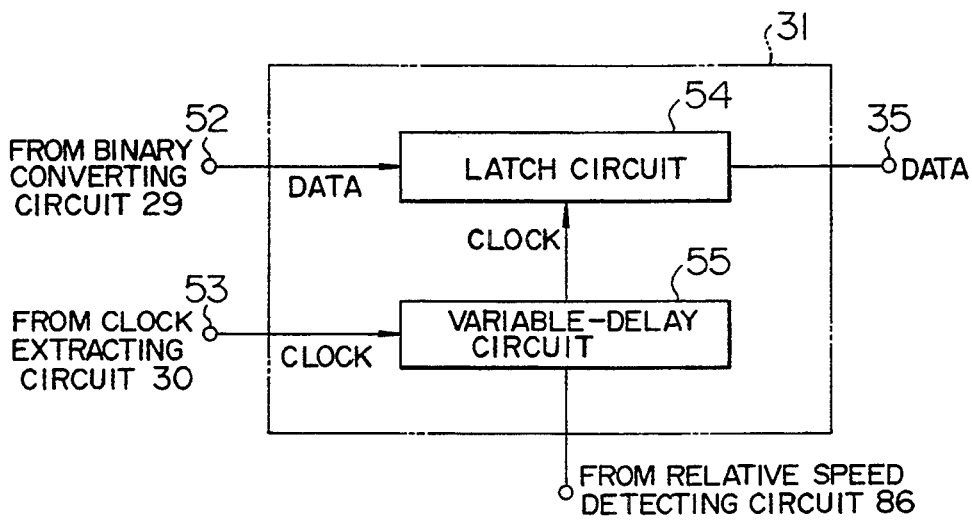
FIG. 6 is a block diagram showing in detail the structure of one form of the data strobe circuit incorporated in the data extracting circuit shown in FIG. 2.

FIG. 6 shows in detail the structure of one form of the data strobe circuit 31. Referring to FIG. 6, the data input applied through a data input terminal 52 to a latch circuit 54 is sampled by the clock signal. In the form shown in FIG. 6, the clock signal applied from the clock extracting circuit 30 to a clock signal input terminal 53, thence to a variable-delay circuit 55 is delayed in response to the relative speed signal applied from the relative speed detecting circuit 86. The output signal of the relative speed detecting circuit 86 acts to change the amount of delay so as to optimize the delay. It is apparent that the recorded data may be delayed.

By employment of means as described above, a substantially constant error rate as shown by the solid curve in FIG. 11 can be obtained according to the present invention, so that undesirable degradation of both the picture quality and the sound quality can be prevented.

Figure 7:
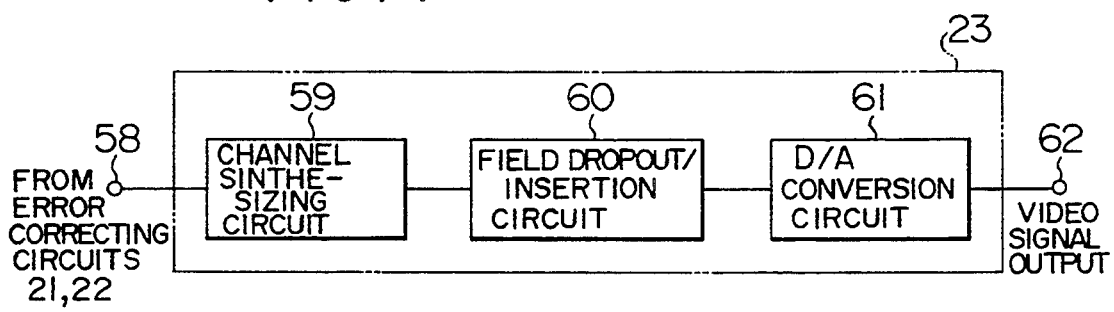
FIG. 7 is a block diagram showing in detail the structure of one form of the video signal processing circuit incorporated in the embodiment shown in FIG. 1.

The clock signal and the continuous or serial recorded data thus derived are supplied to the error correcting circuit 21 shown in FIG. 1. In the error correcting circuit 21, the serial data is subjected to demodulation ($M^2$ demodulation in the illustrated embodiment), and the synchronizing signal is also detected. Thus, the serial data is converted into 8-MHz 8-bit parallel data, and error correction is carried out by the use of the read-solomon code. The output of the error correcting circuit 21 is applied to the video signal processing circuit 23 together with the output of the other error correcting circuit 22 connected to the data extracting circuit 19. FIG. 7 shows in detail the structure of one form of the video signal processing circuit 23. Referring to FIG. 7, the recorded data of two channels supplied from the error correcting circuits 21 and 22 shown in FIG. 1 to a data input terminal 58 are synthesized in a channel synthesizing circuit 59. Then, after temporarily storing the recorded data in a memory as in the case of the prior art apparatus described already, the digital video signal is generated from a field dropout/insertion circuit 60. The digital video signal is then converted by a D/A conversion circuit 61 into an analog video signal which appears at an output terminal 62.

Figure 8:
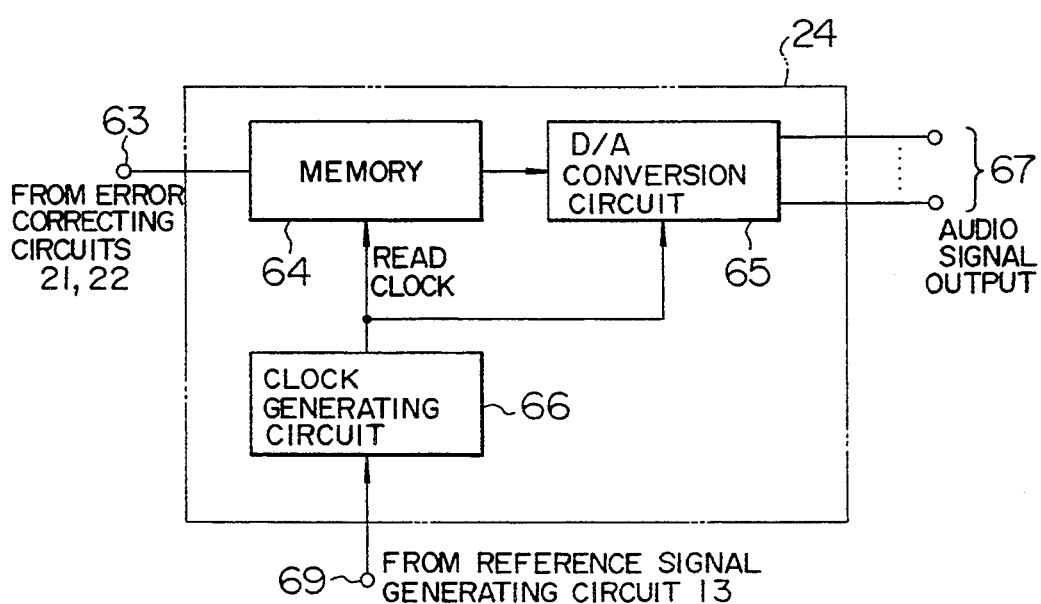
FIG. 8 is a block diagram showing in detail the structure of one form of the audio signal processing circuit incorporated in the embodiment shown in FIG. 1.

FIG. 8 shows in detail the structure of one form of the audio signal processing circuit 24 shown in FIG. 1. Referring to FIG. 8, the digital audio signals (4 channels) applied from the error correcting circuits 21 and 22 to an input terminal 63 are written and stored in a memory 64, and, after being read out from the memory 64 in response to a read clock signal applied from a clock generating circuit 66, converted by a D/A conversion circuit 65 into analog audio signals to appear at output terminals 67. The clock signal generated from the clock generating circuit 66 is locked by the reference signal applied from the reference signal generating circuit 13 shown in FIG. 1 to an input terminal 69, so that the clock signal having a frequency of 48 KHz $\pm n\%$ is accurately generated under the condition where the tape speed variation is $\pm n\%$. Therefore, the tone pitch of the analog audio output signals changes accurately according to a change in the moving speed of the magnetic tape 2.

It will be seen from the foregoing description of the present invention that compression and expansion of picture data at the time of reproduction can be carried out without substantially degrading both the picture quality and the sound quality.

Figure 9:
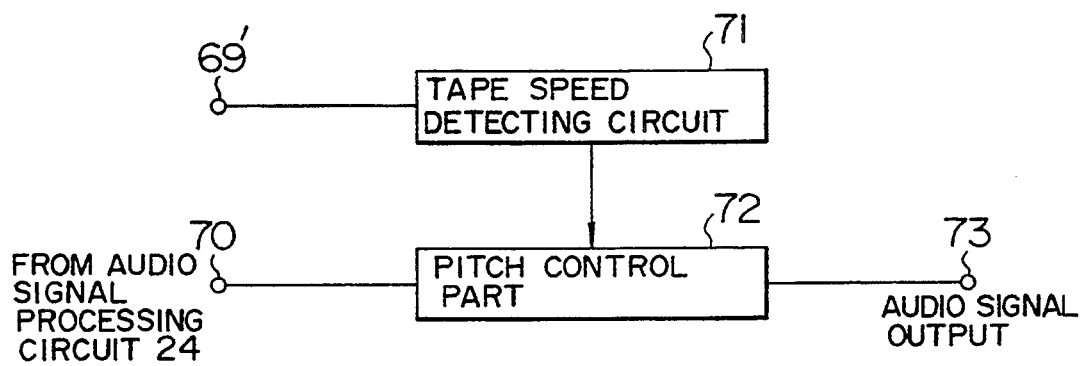
FIG. 9 shows the structure of a prior art pitch controller.
Figure 10:
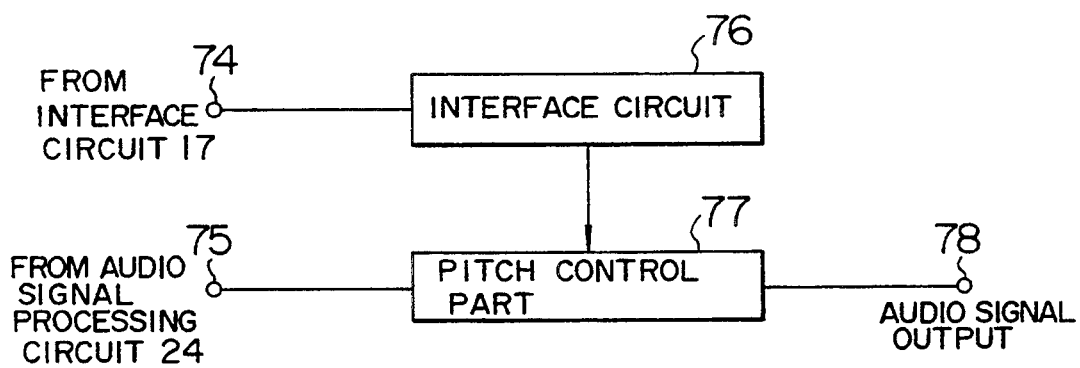
FIG. 10 shows the structure of a pitch controller used in the present invention.

A prior art controller and that used in the present invention will be compared by referring to FIGS. 9 and 10. FIG. 9 shows the structure of the prior art pitch controller. Referring to FIG. 9, a tape speed detecting circuit 71 detects the tape speed on the basis of a change in a time code signal applied to an input terminal 69' from a VTR, and the tone pitch is corrected by a pitch control part 72. This prior art arrangement is effective when both an audio signal and the time code are recorded on linear tracks as in the case of a 1-inch VTR. However, when wow-flutter occurs on the tape movement, the time code is adversely affected by the wow-flutter, and the tape speed detecting circuit 71 decides that a change has occurred on the tape speed. FIG. 10 shows the structure of the pitch controller used in the present invention. In the present invention, the digital audio signal is D/A converted in response to the clock signal locked by the output signal of the reference signal generating circuit 13, so that wow-flutter occurring on the magnetic tape 2 is entirely absorbed, and its adverse effect can be fully eliminated. Referring to FIG. 10 showing the structure of the pitch controller, the interface circuit 17 connected to the system control unit 16 is connected to an input terminal 74 of another interface circuit 76, and the reference signal indicating whether or not the playback speed is changed by n% is directly applied from the reference signal generating circuit 13 to the pitch controller. A pitch control part 77 receives the audio signal through an input terminal 75 and accurately corrects the tone pitch in response to the output signal of the interface circuit 76, and the audio output signal having the accurately corrected tone pitch appears on an output terminal 78. Therefore, undesirable degradation of the sound quality can be prevented.

In the illustrated embodiment of the present invention, the relative speed detecting circuit 86 in the servo unit 14 controls the various elements in the data extracting circuit 20. Thus, undesirable degradation of the error rate can be prevented even when the data transfer rate changes in the high-speed search mode, and the reproduced picture quality in the high-speed search mode can also be improved. In this case, the magnetic tape is driven in the real drive mode instead of the capstan drive mode, and the moving speed of the magnetic tape cannot be detected by the capstan FG coil. Therefore, it is necessary to detect the tape speed on the basis of the CTL signal or the rotation speed of the reel motor.

Further, in the present invention, the servo unit acts so that the tape speed and the cylinder rotation speed are locked by the command signals applied from the system control unit at the time of picture data compression and expansion in the playback mode. Therefore, the relative speed information may be directly supplied to the individual controlled blocks.

It will be understood from the foregoing detailed description that the present invention provides a digital video signal reproducing apparatus capable of attaining picture data compression and expansion in the playback mode without substantially degrading both the picture quality and the sound quality.

What is claimed is:

1. A digital video signal reproducing apparatus including a capstan for driving a magnetic tape and a drum having a plurality of magnetic heads for scanning tracks of said magnetic tape, data extracting means for extracting digital data from a reproduced recorded signal through the plurality of magnetic heads, and error correction means for correcting errors in the digital data, said capstan and said drum being driven at a non-standard speed so as to reproduce and store data recorded on said magnetic tape, and to carry out compression and expansion of the recorded data in reproduction, said apparatus comprising:

command signal generating means for generating a command signal in the reproduction so as to instruct one of compression and expansion of the recorded data including at least one of video data and audio data, the command signal including information for instructing at least a tape running speed and a drum rotation speed; and said data extracting means having at least one variable characteristic for controlling extracting of data in accordance therewith, said data extraction means being responsive to said command signal for varying the at least one variable characteristic so as to reduce increasing error in reproduced recorded data which error normally increases at the non-standard speed.

2. A digital video signal reproducing apparatus according to claim 1, wherein said apparatus further comprises a tension detecting circuit for detecting the tension of said magnetic tape so as to thereby generate a tape tension signal, a tape tension reference signal generating circuit for generating a tape tension reference signal in response to said command signal for instructing the tape running speed and the drum rotation speed, an arithmetic circuit computing a difference between said tape tension reference signal and said tape tension signal so as to thereby generate a difference signal, and a tape reel driver for generating a drive signal for driving said tape reel in response to said difference signal, the tape tension being changed to keep the magnetic heads-to-the magnetic tape contact good in response to the command signal.

3. A digital video signal reproducing apparatus according to claim 1, wherein said data extracting means includes at least one of a waveform equalizing circuit, a clock extracting circuit, and a data strobe circuit, at least one of the waveform equalizing circuit, clock extracting circuit and data strobe circuit being responsive to the command signal for varying the at least one variable characteristic of said data extracting means.

4. A digital video signal reproducing apparatus according to claim 3, wherein said data extracting means includes said waveform equalizing circuit, said clock extracting circuit, and said data strobe circuit.

5. A digital video signal reproducing apparatus including a capstan for driving a magnetic tape and a drum having a plurality of magnetic heads for scanning tracks of said magnetic tape said capstan and said drum being driven at an non-standard speed so as to reproduce and store data recorded on said magnetic tape, and to carry out compression and expansion of the recorded data in reproduction, said apparatus comprising:

command signal generating means including a relative speed detecting circuit for detecting a relative speed which is the vector sum of the moving speed of said magnetic tape and the rotation speed of said drum thereby generating a relative speed signal based on the detected relative speed; and data extracting means including at least one data extracting circuit having a waveform equalizer circuit for equalizing the frequency of said recorded data to that having a predetermined frequency characteristic in response to said relative speed signal so as to eliminate waveform interference from said recorded data, so that said recorded data can be transferred at a data transfer rate required for processing said recorded data, a clock extracting circuit for quantizing the equalized recorded data thereby generating a clock signal determined on the basis of said quantized recorded data, and a data strobe circuit for sampling said quantized recorded data by said clock signal thereby generating said recorded data from which jitter is removed.

6. A digital video signal reproducing apparatus including a capstan for driving a magnetic tape and a drum having a plurality of magnetic heads for scanning tracks of said magnetic tape, said capstan and said drum being driven at a non-standard speed so as to reproduce and store data recorded on said magnetic tape, and to carry out compression and expansion of the recorded data in reproduction, said apparatus comprising command signal generating means for generating a command signal in the reproduction so as to instruct compression and expansion of the recorded data including at least one of video data and audio data, data extracting means for controlling at least one characteristic of said recorded data in response to said command signal so as to reduce an error rate of reproduced recorded data, and a servo unit driving said capstan and said drum, said servo unit including phase detecting means for comparing a signal indicative of a rotation speed of said drum with a predetermined reference signal so as to thereby detect the phase difference between, frequency discriminating means for discriminating the frequency of said drum rotation speed signal on the basis of a target value based on a command signal instructing the rotation speed of said drum, drum drive means generating a drum drive signal driving said drum on the basis of the detected phase difference and the result of frequency discrimination, said drum drive signal being changed at a predetermined time interval in response to a change in said target value, first error computing means discriminating the frequency of a signal indicative of the rotation speed of said capstan on the basis of a target value based on a command signal instructing the rotation speed of said capstan so as to thereby compute the phase difference between said capstan rotation speed signal and said target value, second error computing means delaying said drum rotation reference signal according to said capstan rotation speed signal so as to thereby generate a delayed reference signal and computing the phase difference between said delayed reference signal and a predetermined control signal recorded on said magnetic tape, and capstan drive means for generating a capstan drive signal driving said capstan on the basis of the phase differences computed by said first error computing means and said second error computing means, respectively, the amount of delay of said delay of said delayed reference signal being changed according to said capstan rotation speed command signal.

7. A digital video signal reproducing apparatus including a capstan for driving a magnetic tape and a drum having a plurality of magnetic heads for scanning tracks of said magnetic tape, said capstan and said drum being driven at a non-standard speed so as to reproduce and store data recorded on said magnetic tape, and to carry out compression and expansion of the recorded data in reproduction, said apparatus comprising:
command signal generating means including means for generating a relative speed signal; and
data extracting means including at least one data extracting circuit having a waveform equalizer circuit for equalizing a frequency response of said reproduced recorded data so that having a predetermined frequency characteristic in response to said relative speed signal so as to eliminate waveform interference from said recorded data as a control of at least one characteristic of said recorded data, a clock extracting circuit having means for changing at least one characteristic of said clock extracting circuit in response to said relative speed signal so as to eliminate an unlock state, and a data strobe circuit having means for changing a strobe timing in response to each relative speed signal so as to strobe said recorded data correctly.

8. A digital video signal reproducing apparatus according to claim 7, wherein said apparatus further comprises a tension detecting circuit for detecting the tension of said magnetic tape so as to thereby generate a tape tension signal, a tape tension reference signal generating circuit for generating said tape tension reference signal in response to said relative speed signal, an arithmetic circuit computing the difference between said tape tension signal and said tape tension reference signal, and a tape reel driver for generating in response to said difference a drive signal for driving said tape reel.

9. A digital video signal reproducing apparatus according to claim 8, further comprising a servo unit driving said capstan and said drum, said servo unit controlling said capstan and said drum to rotate in response to said command signal, and limitation means of said command signal for changing said capstan and said drum rotation speed by predetermined steps to a target rotation speed.

10. A digital video signal reproducing apparatus according to claim 7, wherein said means for generating a relative speed signal include a relative speed detecting circuit detecting a relative speed which is the vector sum of the moving speed of said magnetic tape and the rotation speed of said drum and for generating a relative speed signal based on the detected relative speed.

11. A digital video signal reproducing apparatus including a capstan for driving a magnetic tape and a drum having a plurality of magnetic heads for scanning tracks of said magnetic tape, data extracting means for extracting digital data from a reproduced recorded signal through the plurality of magnetic heads, and error correction means for correcting errors in the digital data, said capstan and said drum being driven at a non-standard speed so as to reproduce and store data recorded on said magnetic tape, and to carry out compression and expansion of the recorded data in reproduction, said apparatus comprising:
command signal generating means for generating a relative speed signal;
said data extracting means having at least one variable characteristic for controlling extraction of data in accordance therewith, said data extracting means being responsive to said relative speed signal for varying the at least one variable characteristic so as to reduce increasing error in reproduced recorded data which error normally increases at the non-standard speed.

12. A digital video signal reproducing apparatus according to claim 11, wherein said data extracting means includes at least one of a waveform equalizing circuit, a clock extracting circuit, and a data strobe circuit, at least one of the waveform equalizing circuit, clock extracting circuit and data strobe circuit being responsive to the command signal for varying the at least one variable characteristic of said data extracting means.

13. A digital video signal reproducing apparatus according to claim 12, wherein said data extracting means includes said waveform equalizing circuit, said clock extracting circuit, and said data strobe circuit.

14. A digital video signal reproducing apparatus according to claim 11, wherein said command signal generating means for generating a relative speed signal include a relative speed detecting circuit detecting a relative speed which is the vector sum of the moving speed of said magnetic tape and the rotation speed of said drum and for generating a relative speed signal based on the detected relative speed.

* * * * *